Patented Dec. 3, 1935

2,022,674

UNITED STATES PATENT OFFICE 2,022,674

COMPOSITION OF MATTER CONTAINING UREA AND NITRATES, PROCESS FOR ITS PREPARATION AND USE

Walter H. Kniskern, Prince George County, Va., and Charles K. Lawrence, Syracuse, N. Y., assignors to Atmospheric Nitrogen Corporation, New York, N. Y., a corporation of New York No Drawing. Application January 21, 1933, Serial No. 652,923

11 Claims. (Cl. 71—9)

This application is a continuation of our copending United States application Serial No. 611,232, filed May 13, 1932 and is related to our copending United States application Serial No. 652,922, filed January 21, 1933.

In our said applications Serial No. 611,232 and Serial No. 652,922, we have described new compositions useful in the production of fertilizers containing urea, ammonia and a nitrate salt such as ammonium nitrate or sodium nitrate. The invention of this application particularly relates to compositions containing urea, ammonia, and nitrates, to processes for their preparation and use in the production of fertilizers and to a method for the transportation of urea, ammonia and nitrates. Sodium nitrate, ammonium nitrate and potassium nitrate, are examples of nitrates which may be utilized in carrying out this invention.

The methods for the fixation of atmospheric nitrogen recently developed make available from this source large amounts of ammonia for industrial purposes and particularly for the production of fertilizers. In the ammonia synthesis process for the production of fixed nitrogen in which hydrogen is obtained from water gas or similar gases containing compounds of carbon, large amounts of carbon dioxide are separated from the gas as a by-product in the preparation of the hydrogen-nitrogen gas mixture required for the synthesis of ammonia. This carbon dioxide may be utilized by combining it with the ammonia to form urea. The synthetic ammonia may likewise be oxidized to nitrogen oxides and these oxides absorbed in bases such as sodium or potassium carbonate or sodium or potassium hydroxide, to produce sodium nitrate or potassium nitrate, or, the nitrogen oxides may be converted to nitric acid for treatment with sodium, potassium or ammonium carbonates or hydroxide or with anhydrous ammonia, to form sodium, potassium or ammonium nitrate. There are, therefore, available at synthetic ammonia plants the several products; ammonia, urea, and nitrates such as sodium nitrate, potassium nitrate and ammonium nitrate.

The marketing of these separate products is, however, attended by difficulties and expensive operations. The ammonia is obtained either in the form of liquid ammonia or of aqua ammonia. The liquid ammonia has relatively high vapor pressures at ordinary temperatures and the aqua ammonia contains a considerable proportion of water, both of which factors make the transportation of large quantities of ammonia difficult and expensive. With respect to sodium, potassium and ammonium nitrate and urea, these materials are usually produced in aqueous solution and, in order to obtain them as the solid, expensive evaporations must be carried on.

It is frequently desirable to prepare a fertilizer containing both phosphorus and nitrogen and this may be done by treating monocalcium acid phosphate materials, such as superphosphate or triple superphosphate, with ammonia. When relatively large proportions of ammonia are added to a superphosphate material, however, the ammonia tends to cause water soluble and citrate soluble $P_2O_5$ in the superphosphate to revert to a citrate insoluble form which is not considered available as plant food. It is often desirable, however, to obtain a fertilizer product containing a higher proportion of nitrogen than may be obtained by treating a superphosphate material with ammonia alone in an amount which does not cause excessive reversion of $P_2O_5$.

It is, accordingly, an object of this invention to provide compositions of matter comprising the nitrogen-containing products readily available at synthetic ammonia plants (urea, sodium, potassium and ammonium nitrate and ammonia), which compositions may be conveniently transported as liquids of low vapor pressure containing a relatively high percentage of nitrogen. It is further an object of this invention to provide a process for the economical preparation for transportation of urea, nitrates and ammonia in the form of liquid compositions containing these valuable ingredients. Another object of the invention is to provide a process for the production of fertilizers which may contain a relatively high proportion of nitrogen by treating a monocalcium acid phosphate material, for example, superphosphate, triple superphosphate or mixtures containing the same, with a liquid composition comprising urea, a nitrate and ammonia.

We have discovered that the solubility of urea in ammoniacal liquids may be modified by dissolving sodium nitrate in the liquid. Thus we have found that whereas solutions of urea in about 50% aqua ammonia (a solution of ammonia in water containing 50% $NH_3$) saturated at 4.5° C. contain about 1.33 parts of urea for every 1 part of ammonia in the solution, if sodium nitrate is added to such a saturated urea-ammonia-water solution, additional urea may be dissolved so that a solution containing about 1.61 parts of urea and 1.61 parts of sodium nitrate for every 1 part of ammonia, which does not salt out at temperatures above 4.5° C., may be prepared. Similarly, whereas a solution of urea in about 50% aqua ammonia saturated at 0° C. contains about 1.17 parts of urea for every 1 part of ammonia, if sodium nitrate is added to the urea-ammonia-water solution, a solution containing 1.33 parts of urea and 0.59 parts of sodium nitrate for every 1 part of ammonia which does not salt out at temperatures above −2° C., may be prepared.

We have found that the same phenomenon holds true for anhydrous liquid ammonia as for aqua ammonia. Thus, at −2° C., a saturated solution of urea in anhydrous liquid ammonia contains about 0.46 parts of urea for every 1 part of ammonia whereas, if to this urea-ammonia solution sodium nitrate is added, the solubility of the urea is increased so that a solution of urea and sodium nitrate in liquid anhydrous ammonia may be prepared containing 1.17 parts of urea and 1.17 parts of sodium nitrate for every 1 part of ammonia which does not salt out at temperatures above −2° C. A solution likewise may be prepared of urea and sodium nitrate in anhydrous liquid ammonia containing 0.72 parts of urea and 0.31 parts of sodium nitrate for every 1 part of ammonia which does not salt out at temperatures above 2° C., and a solution may be prepared containing about 0.55 parts of urea and 1.24 parts of sodium nitrate for every 1 part of anhydrous liquid ammonia which does not salt out at temperatures above 2.6° C.

Not only does the presence of the sodium nitrate increase the solubility of the urea but we have discovered that the converse relationship holds true; i. e., that by dissolving urea in solutions of sodium nitrate in aqua ammonia or liquid anhydrous ammonia, the solubility of the sodium nitrate in the liquid may be increased. Thus, for example, a solution of sodium nitrate in about 50% aqua ammonia saturated at 4.5° C. contains about 1.21 parts of sodium nitrate for every 1 part of ammonia. As stated above, by dissolving urea in the sodium nitrate-ammonia-water solution a liquid composition containing 1.61 parts of urea and 1.61 parts of sodium nitrate for every 1 part of ammonia which does not salt out at temperatures above 4.5° C., may be prepared. Sodium nitrate is soluble in liquid anhydrous ammonia to the extent of about 1.30 parts of sodium nitrate for every 1 part of liquid anhydrous ammonia at a temperature of 6.7° C. A liquid composition may be prepared, however, containing about 1.37 parts of sodium nitrate and about 0.97 parts of urea for every 1 part of liquid anhydrous ammonia which does not salt out at temperatures above 6.7° C.

These phenomena discovered by us of the mutual influence of urea and sodium nitrate upon the solubility of each other in ammoniacal solutions either in anhydrous liquid ammonia or in aqua ammonia are of important practical value since they make available compositions which retain their fluid state at ordinary atmospheric temperatures and contain a high proportion of nitrogen-bearing materials; i. e., urea, sodium nitrate and ammonia. Furthermore, these solutions do not present serious difficulties due to the separation of solid from the liquid under ordinary conditions. Any solid material which may, under certain circumstances, separate out may be redissolved by a slight warming of the solution. These highly concentrated solutions may, therefore, be economically utilized for the transportation of fixed ammonia. They are of practical value in the preparation of fertilizers by addition, for example, to superphosphate. Since they contain but a relatively small amount of water, they permit the direct production of commercially dry granular fertilizer products by adding the solutions to superphosphate. They permit the production of phosphate fertilizers containing a high proportion of plant food. Since they contain a large proportion of total nitrogen for a given amount of alkaline ammonia, the addition of these solutions to a superphosphate in amount such that the alkaline ammonia does not cause excessive reversion of available $P_2O_5$ in the superphosphate imparts to the resulting fertilizer a high nitrogen content. The fertilizers thus prepared are in excellent physical condition and may contain nitrate-nitrogen, ammonia-nitrogen and urea-nitrogen.

An important characteristic of the urea-sodium nitrate-ammonia solutions of this invention is their lower vapor pressures than the vapor pressures of liquid ammonia or of aqua ammonia of a corresponding concentration. Liquid anhydrous ammonia has vapor pressures which range from 4.2 atmospheres absolute at 0° C. to 11.5 atmospheres absolute at 30° C. A solution comprising about 30.6 parts urea, 25.5 parts sodium nitrate and 43.9 parts of anhydrous liquid ammonia which does not salt out at temperatures above −4° C. has a vapor pressure at 0° C. of about 2.8 atmospheres absolute and at 30° C. of 8.2 atmospheres absolute. Similarly, a liquid composition comprising about 19.7 parts of urea, 44.4 parts of sodium nitrate and 35.9 parts of liquid anhydrous ammonia, which does not salt out at temperatures above 2.6° C., has a vapor pressure at 0° C. of about 1.9 atmospheres absolute and at 30° C. of about 5.7 atmospheres absolute. Aqua ammonia containing 50% $NH_3$ has a vapor pressure at 0° C. of about 1.1 atmospheres absolute and at 30° C. of about 3.5 atmospheres absolute. A solution comprising about 15 parts of urea, 32 parts of sodium nitrate and 53 parts of 50% aqua ammonia, which does not salt out at temperatures above 1° C., has a vapor pressure at 0° C. of about 0.6 atmosphere absolute and at 30° C. of about 2 atmospheres absolute.

The materially lower vapor pressures of the compositions of this invention greatly facilitate their handling during transportation, their storage and their manipulation in the preparation of fertilizers. Solutions of urea and sodium nitrate in anhydrous liquid ammonia and urea-sodium nitrate - ammonia - water compositions, particularly water-containing compositions in which the water is in amount not more than 40% by weight of the total liquid, which are substantially saturated with solid components at temperatures between about −30° C. and 30° C. and particularly at about 0° C., are advantageous both because their use in the treatment of superphosphate materials for the production of fertilizers permits of adding to the phosphate relatively large amounts of nitrogen-containing material for a given amount of basic ammonia and because of their relatively low vapor pressures, which facilitate their handling.

Urea, sodium nitrate and ammonia may be prepared for transportation and/or use in the preparation of fertilizers in the form of the liquid compositions of this invention by admixing dry solid sodium nitrate and urea with either liquid or gaseous anhydrous ammonia or with aqua ammonia, the gaseous anhydrous ammonia being absorbed by the solids to form a liquid product. One of the solids may be added to a solution or slurry of the other in liquid or aqua ammonia.

In preparing aqueous compositions water solutions or slurries containing sodium nitrate and urea may be treated with anhydrous or aqua ammonia or gaseous ammonia may be absorbed in the solution or slurry. In general, the compositions may be prepared by admixing the desired proportions of the urea, sodium nitrate and ammonia, with or without water, and any one or more of the components may contain proportions of the other components.

We have also discovered that the solubility of urea in ammoniacal liquids may be modified by dissolving ammonium nitrate in the liquid. Thus we have found that whereas a solution of urea in about 50% aqua ammonia saturated at 10° C. contains 1.52 parts of urea for every 1 part of $NH_3$ in the solution, if ammonium nitrate is added to such a saturated urea-ammonia-water solution additional urea may be dissolved in the solution, so that a solution containing 1.35 parts of ammonium nitrate and 2.09 parts of urea for every 1 part of ammonia which does not salt out at 10° C. or above may be prepared.

We have found that the same phenomena hold true for anhydrous liquid ammonia as for aqua ammonia. Thus at 14° C. a saturated solution of urea in the anhydrous liquid ammonia contains about 0.79 part of urea for every 1 part of ammonia. If to this urea-ammonia solution ammonium nitrate is added, the solubility of the urea is increased so that, for example, a solution of urea and ammonium nitrate in liquid anhydrous ammonia may be prepared containing 1.05 parts of urea and 0.58 part of ammonium nitrate for every 1 part of ammonia which does not salt out at 14° C. or above.

Not only does the presence of the ammonium nitrate increase the solubility of the urea but we have discovered that the converse relationship holds true; i. e., that by dissolving urea in solutions of ammonium nitrate in liquid anhydrous ammonia or in aqua ammonia, the solubility of the ammonium nitrate in the liquid may be increased. Thus, for example, a solution of ammonium nitrate in about 50% aqua ammonia saturated at −5° C. contains about 3.15 parts of ammonium nitrate for every 1 part of ammonia. By dissolving urea in the ammonium nitrate-ammonia-water liquor the solubility of ammonium nitrate is increased so that, for example, a solution in 50% aqua ammonia of urea and ammonium nitrate which does not salt out at −5° C. may be prepared containing about 1.18 parts of urea and about 4.05 parts of ammonium nitrate for every 1 part of ammonia. This effect of urea upon the solubility of ammonium nitrate is also evident in solutions of these substances in anhydrous liquid ammonia. A solution of ammonium nitrate in anhydrous liquid ammonia saturated at −2° C. contains about 2.78 parts of ammonium nitrate for every 1 part of ammonia whereas a solution of urea and ammonium nitrate in liquid anhydrous ammonia which does not salt out at −2° C. may be prepared containing 1.05 parts of urea and 3.21 parts of ammonium nitrate for every 1 part of ammonia.

As in the case of the urea-sodium nitrate-ammonia solutions, an important characteristic of the urea-ammonium nitrate-ammonia solutions of this invention, is their lower vapor pressures than that of liquid ammonia or of an aqua ammonia of a corresponding concentration. A solution which does not salt out at temperatures above about −5° C. of urea-ammonium nitrate-ammonia-water having a composition of 16.4% urea, 56.3% ammonium nitrate, 13.9% ammonia and 13.4% water has a vapor pressure ranging from 0.3 atmosphere absolute to 0.8 atmosphere absolute for temperatures between 0° C. and 30° C. Throughout this range of temperatures the vapor pressure of this solution is less than 1 atmosphere, whereas for an aqua ammonia of corresponding composition (about 50% aqua) the vapor pressure is from 1 to 3.6 atmospheres. Liquid anhydrous ammonia has a vapor pressure ranging from 4.2 to 11.5 atmospher absolute for temperatures from 0° C. to 30° C. A solution of urea and ammonium nitrate in liquid anhydrous ammonia which does not salt out at −2° C. and containing 20% urea, 61% ammonium nitrate and 19% ammonia, has a vapor pressure of from 0.5 to 1.9 atmospheres absolute for temperatures ranging from 0° C to 30° C. Solutions of urea and ammonium nitrate in anhydrous liquid ammonia which are substantially saturated with urea at a temperature below 30° C., and particularly at about 0° C., and which contain about 1 part of urea to above about 2 parts of ammonium nitrate, are particularly advantageous from the viewpoint of their relatively low vapor pressures. With water present, however, solutions of a low vapor pressure may be prepared containing a higher ratio of urea to ammonium nitrate.

The solubility of potassium nitrate in ammoniacal liquids may be increased by the addition of urea and conversely the solubility of urea may be increased by the addition of potassium nitrate. Thus, at 0° C. a saturated solution of urea in anhydrous liquid ammonia contains about 0.49 part of urea for every 1 part of ammonia, whereas, if to this urea-ammonia solution potassium nitrate is added, the solubility of the urea is increased so that a solution of urea and potassium nitrate in liquid anhydrous ammonia may be prepared containing 0.59 part of urea and 0.1 part of potassium nitrate for every 1 part of ammonia which does not salt out at temperatures above 0° C. A solution of urea and potassium nitrate in anhydrous liquid ammonia may also be prepared containing 0.77 part of urea and 0.27 part of potassium nitrate for every 1 part of ammonia which solution does not salt out at temperatures above about 7° C.

A solution of potassium nitrate in anhydrous liquid ammonia saturated at 0° C. contains about 0.1 part of potassium nitrate for every 1 part of ammonia. If, however, urea is dissolved in this solution of potassium nitrate, the solubility of the potassium nitrate is increased so that a solution in anhydrous liquid ammonia may be prepared containing about 0.46 part of urea and about 0.24 part of potassium nitrate for every 1 part of ammonia, which does not salt out at temperatures above about 0° C.

In general the solutions of urea, ammonium nitrate and ammonia and urea, potassium nitrate and ammonia may be prepared in the manners herein described for the preparation of urea-sodium nitrate-ammonia compositions by using solutions or slurries of ammonium nitrate or potassium nitrate or the solid salts themselves in place of the sodium nitrate or solutions or slurries of the same. The invention is not limited, however, to such methods of preparing the compositions containing ammonium or potassium nitrate.

By the addition of urea and ammonium nitrate or potassium nitrate to ammoniacal liquids having relatively high vapor pressures, at ordinary atmospheric temperatures, the vapor pressures may be materially reduced and liquid compositions having vapor pressures not substantially in excess of atmospheric at ordinary temperatures, may be thus prepared. As in the case of the compositions containing sodium nitrate, liquid compositions containing ammonia, urea and ammonium nitrate or potassium nitrate, which are substantially saturated with solid components at temperatures between about −30° C. and 30° C., and particularly at about 0° C., are advantageous both because of their making possible the addition to a superphosphate of relatively large amounts of nitrogen containing material for a given amount of basic ammonia and because of their relatively low vapor pressures, which facilitate their handling and transportation.

The urea-ammonia-nitrate compositions of this invention may be readily transported in a transportable package comprising a container and the liquid composition. Due to the material lowering of the vapor pressures of ammoniacal liquids by dissolving urea and sodium nitrate, potassium nitrate or ammonium nitrate therein, the containers in which the liquids are shipped are not subjected to the relatively higher vapor pressures of the ammoniacal liquids themselves. In many cases relatively high vapor pressures of ammoniacal liquids at ordinary atmospheric temperatures which, without the urea and a nitrate being present are materially above atmospheric, may be lowered by dissolving in the ammoniacal liquid urea and a nitrate to such an extent as to permit its transportation and handling in low pressure containers, whereas an ammoniacal liquid of corresponding composition without these materials being present, would require special equipment for its transportation. It is of advantage to dissolve in ammoniacal liquids having vapor pressures materially above atmospheric pressure at ordinary temperatures, urea and a nitrate in amount at least sufficient to lower the vapor pressure of the ammoniacal liquid to about atmospheric at ordinary atmospheric temperatures.

The following examples are illustrative of methods of preparing the solutions of this invention. Throughout this specification and in the claims, the proportions of materials are referred to as parts by weight:

*Example I.*—A substantially anhydrous liquid composition may be prepared by mixing about 54 parts of solid urea with about 46 parts of liquid anhydrous ammonia. These materials form a slurry which at −2° C. contains about 48 parts of undissolved CO(NH$_2$)$_2$.NH$_3$. To the foregoing mixture are then added about 54 parts of sodium nitrate for each 100 parts of the mixture. After thorough admixing a substantially homogeneous composition will form at temperatures of about −2° C. and above. At 30° C. the composition has a vapor pressure of about 6 atmospheres absolute which is equivalent to the pressure of about a 62% aqua ammonia at the same temperature.

*Example II.*—About 61.5 parts of solid urea are admixed with about 38.5 parts of liquid anhydrous ammonia. The mixture thus obtained would contain about 60 parts of undissolved CO(NH$_2$)$_2$.NH$_3$ at a temperature of 4.5° C. About 41 parts of water are then added to 100 parts of the foregoing composition and the resulting mixture would contain about 10.5 parts of undissolved urea at 4.5° C. About 61.5 parts of solid sodium nitrate are then added to about 141 parts of the urea-ammonia-water composition and admixed therewith. This mixture forms a homogeneous composition which will not salt out at a temperature of about 4.5° C. or above. At 30° C. the composition has a vapor pressure of about 1.8 atmospheres absolute which is equivalent to the vapor pressure of about 38% aqua ammonia at the same temperature.

A similar composition may be prepared by admixing about 61.5 parts of solid sodium nitrate and about 38.5 parts of liquid anhydrous ammonia and then adding to 100 parts of this mixture about 41 parts of water. The resulting mixture at a temperature of 4.5° C. would contain about 15 parts of undissolved sodium nitrate. Upon adding about 61.5 parts of solid urea to about 141 parts of the sodium nitrate-ammonia-water composition a homogeneous product results which does not salt out at temperatures above about 4.5° C.

*Example III.*—About 58 parts of solid sodium nitrate and about 42 parts of liquid anhydrous ammonia are admixed to form a mixture in which at 6.7° C. about 3.3 parts of the sodium nitrate remain undissolved. To 100 parts of this mixture are added about 41 parts of solid urea. The resulting homogeneous product does not salt out at temperatures above about 6.7° C. At 30° C. this composition has a vapor pressure of about 5.5 atmospheres absolute which is equivalent to the vapor pressure of about 60% aqua ammonia at 30° C.

*Example IV.*—About 51 parts of a urea-water composition containing about 39 parts of urea, such as may be obtained in a process for the synthesis of urea from ammonia and carbon dioxide, are mixed with about 51 parts of sodium nitrate (calculated on the dry basis, although the nitrate may contain adhering mother liquor as it is recovered from solution in a process for its manufacture), about 40 parts of anhydrous liquid ammonia and enough water to bring the total weight of the mixture up to about 170 parts, which requires the addition of about 28 parts of water, making a total of about 40 parts of water in the 170 parts of solution.

The solution of this example may be utilized in the preparation of a fertilizer as follows: About 890 parts of a superphosphate containing 18% P$_2$O$_5$, 100 parts of ammonium sulfate, 160 parts of muriate of potash (containing the equivalent of 50% K$_2$O) and 680 parts of an inert filler are mixed together. About 170 parts of the foregoing urea-sodium nitrate-ammonia-water composition are then sprayed onto the mixture while it is being agitated in, for example, a rotating drum. The resulting product is in excellent physical condition immediately after ammoniation and also after cooling to atmospheric temperature. The fertilizer thus obtained contains approximately 4% N, 8% P$_2$O$_5$ and 4% K$_2$O. About 23% of the total nitrogen of the fertilizer comes from the urea, about 10% is nitrate nitrogen and about 67% is ammonium nitrogen.

*Example V.*—About 47 parts of substantially dry sodium nitrate and 47 parts of substantially dry urea are dissolved in 40 parts of liquid anhydrous ammonia. About 135 parts of this composition are then added in a suitable manner to a mixture containing about 890 parts of superphosphate, 87 parts of ammonium sulphate, 160 parts of potassium sulfate and 730 parts of inert filler such as sand. The resulting fertilizer product is in good physical condition both immediately after admixing the urea-sodium nitrate-ammonia liquor with the solid materials and also after cooling. The product contains about 4% N, 8% P₂O₅ and 4% K₂O.

*Example VI.*—About 50 parts of urea and about 181 parts of ammonium nitrate are dissolved in about 81 parts of 50% aqua ammonia (an aqueous solution of ammonia containing about 40½ parts NH₃ and 40½ parts water). About 312 parts of the liquid thus obtained are sprayed on a mixture of the following materials while they are being agitated in a rotating mixer:

| | Parts about |
|---|---|
| Superphosphate | 890 |
| Potassium sulfate (50% K₂O) | 160 |
| Sand | 638 |

The resulting fertilizer mixture, which is in good physical condition immediately after ammoniation and also after cooling to room temperature, contains 6% N, 8% P₂O₅ and 4% K₂O. The nitrogen is present in the following forms:

| | Per cent |
|---|---|
| Ammonia nitrogen | 3.3 |
| Nitrate nitrogen | 1.5 |
| Urea nitrogen | 1.2 |
| Total nitrogen | 6 |

*Example VII.*—A composition containing urea, potassium nitrate, ammonia and water may be prepared by mixing the following materials: (a) 41½ parts of a urea-water composition containing about 32 parts of urea such as may be obtained from the synthesis of urea from ammonia and carbon dioxide; (b) about 36½ parts of a solution of about 6 parts of potassium nitrate in water; and (c) about 40 parts of anhydrous ammonia. The liquid composition formed by mixing the above ingredients does not salt out at temperatures above −3° C. and has, at 30° C. a vapor pressure of about 2.9 atmospheres absolute, approximately equal to the vapor pressure of 46% aqua ammonia at this temperature.

A fertilizer may be prepared by mixing about 120 parts of the above described liquid composition with a mixture of the following materials:

| | Parts |
|---|---|
| Superphosphate | 890 |
| Ammonium sulfate | 152 |
| Muriate of potash | 155 |
| Inert filler | 685 |

The resulting fertilizer mixture is in good physical condition both immediately after ammoniation and also after cooling. It contains about 4% N, 8% P₂O₅ and 4% K₂O.

*Example VIII.*—About 10 parts of potassium nitrate and 18½ parts of urea are dissolved in about 40 parts of liquid anhydrous ammonia forming a solution which does not salt out at temperatures above about 3° C. About 68½ parts of this solution are then admixed with the following ingredients:

| | Parts |
|---|---|
| Superphosphate | 890 |
| Ammonium sulfate | 180 |
| Potassium sulfate | 150 |
| Sand | 710 |

The resulting fertilizer product is in good physical condition immediately after ammoniation and also after cooling. It contains about 4% N, 8% P₂O₅ and 4% K₂O.

While the above examples are given as illustrative of this invention, numerous modifications and changes may be made in the particular compositions disclosed and methods of employing them in the production of fertilizers. If desired, additional materials such as ammonium phosphate, ammonium sulfate, potassium chloride, etc. or any two or more of these materials which in themselves are valuable fertilizers, may be incorporated with the urea-ammonia-nitrate solutions before they are added to the phosphate material, or they may be incorporated with the phosphate material before, after or simultaneously with the treatment with the urea-ammonia-nitrate compositions. Also solutions containing urea and two or more nitrates may be prepared and used in accordance with this invention, as for example, ammoniacal solutions of urea, sodium nitrate and potassium nitrate or of urea, ammonium nitrate and sodium or potassium nitrate.

When in the appended claims reference is made to a solution "saturated with the solid components" at a given temperature, it is intended to refer to a solution which contains an amount of urea and nitrate, such as sodium, potassium or ammonium nitrate, such that a solid phase containing one or more of these materials does not separate at the given temperature, but which upon cooling to a lower temperature deposits solid urea and/or solid nitrate or a solid comprising either urea or nitrate or both.

We claim:

1. As a new composition of matter, a liquid comprising urea, a nitrate and a substantial proportion of ammonia, said liquid containing an amount of at least one of said urea and nitrate dissolved therein in excess of that necessary for saturation of the liquid in the absence of the other.

2. As a new composition of matter, a solution of both urea and a nitrate in an ammoniacal liquor containing a substantial proportion of ammonia, said solution being substantially saturated with at least one of said urea and nitrate at a temperature between about −30° C. and 30° C.

3. As a new composition of matter, a liquid comprising urea, sodium nitrate and a substantial proportion of ammonia, said liquid containing an amount of at least one of said urea and sodium nitrate dissolved therein in excess of that necessary for saturation of the liquid in the absence of the other.

4. As a new composition of matter, a substantially anhydrous solution of urea and sodium nitrate in ammonia, said solution containing an amount of at least one of said urea and sodium nitrate dissolved therein in excess of that necessary for saturation of the solution in the absence of the other.

5. A process for the preparation for transportation of urea and ammonia which comprises dissolving both urea and a nitrate in an ammoniacal liquor containing a substantial proportion of ammonia, said materials being employed in proportions such that the resulting liquid composition contains an amount of at least one of said urea and nitrate in excess of that necessary for saturation of the ammoniacal liquid in the absence of the other.

6. A process for the preparation for transportation of urea and ammonia which comprises dissolving both urea and sodium nitrate in an ammoniacal liquor containing a substantial proportion of ammonia, said materials being employed in proportions such that the resulting liquid composition contains an amount of at least one of said urea and sodium nitrate in excess of that necessary for saturation of the ammoniacal liquid in the absence of the other.

7. A process for producing a fertilizer which comprises treating a solid acidic fertilizer material with a solution of a nitrate and urea in an ammoniacal liquid containing a substantial proportion of ammonia, said solution containing an amount of at least one of the said nitrate and urea dissolved therein in excess of that necessary for saturation of the ammoniacal liquid in the absence of the other.

8. A process for producing a fertilizer which comprises treating a superphosphate material with a solution of a nitrate and urea in an ammoniacal liquid containing a substantial proportion of ammonia, said solution containing an amount of at least one of the said nitrate and urea dissolved therein in excess of that necessary for saturation of the ammoniacal liquid in the absence of the other.

9. A process for producing a fertilizer which comprises adding to and mixing with a monocalcium acid phosphate material a solution of both urea and a nitrate in an ammoniacal liquor containing a substantial proportion of ammonia, said solution prior to addition to said phosphate material being substantially saturated with at least one of said urea and nitrate at a temperature between about $-30°$ C. and $30°$ C.

10. A process for producing a fertilizer which comprises treating a solid acidic fertilizer material with a solution of sodium nitrate and urea in an ammoniacal liquid containing a substantial proportion of ammonia, said solution containing an amount of at least one of the said sodium nitrate and urea dissolved therein in excess of that necessary for saturation of the ammoniacal liquid in the absence of the other.

11. A process for producing a fertilizer which comprises treating a superphosphate material with a solution of sodium nitrate and urea in an ammoniacal liquid containing a substantial proportion of ammonia, said solution containing an amount of at least one of the said sodium nitrate and urea dissolved therein in excess of that necessary for saturation of the ammoniacal liquid in the absence of the other.

WALTER H. KNISKERN.
CHARLES K. LAWRENCE.